United States Patent [19]

Chaut et al.

[11] Patent Number: 5,195,819
[45] Date of Patent: Mar. 23, 1993

[54] DRY SPIGOT LAMPS

[75] Inventors: Yaron Chaut, Ramat Gan, Israel; Ely Shneider, Rumson, N.J.

[73] Assignee: 4-D Design, Inc., Long Branch, N.J.

[21] Appl. No.: 728,553

[22] Filed: Jul. 11, 1991

[51] Int. Cl.⁵ .............................................. F21V 33/00
[52] U.S. Cl. ..................................... 362/253; 362/806
[58] Field of Search ..................... D26/51, 54, 97, 57; 362/96, 101, 372, 418, 811, 812

[56] References Cited

U.S. PATENT DOCUMENTS

| D. 173,470 | 11/1954 | Barnacle | D26/94 |
|---|---|---|---|
| D. 226,325 | 2/1973 | Poff | D26/73 |
| 1,153,044 | 9/1915 | Dunham | 362/96 |
| 1,225,865 | 5/1917 | Schneible | 362/806 |
| 1,448,640 | 3/1923 | Seely | 362/289 |
| 1,464,382 | 8/1923 | Eaton | 362/289 |
| 2,330,592 | 9/1943 | Kendrick | 362/96 |
| 2,598,357 | 5/1952 | Coleman | 362/96 |
| 3,174,688 | 3/1965 | Chatten | 362/811 |
| 4,343,031 | 8/1982 | Liebegott | 362/289 |
| 4,352,149 | 9/1982 | Stetler | 362/811 |
| 4,586,280 | 5/1986 | Dane | 40/329 |
| 4,749,126 | 6/1988 | Kessener et al. | 362/96 |
| 4,901,922 | 2/1990 | Kessener et al. | 362/96 |

Primary Examiner—Richard R. Cole
Attorney, Agent, or Firm—Benoit Law Corporation

[57] ABSTRACT

A space is illuminated with a light bulb by sticking that light bulb out of the open mouth of a spout of a dry and simulated spigot structure. The light bulb may alternatively be withdrawn into, and stuck out of, the open mouth of the spout. The spigot structure may have a simulated water flow actuator with which the light bulb is actuated.

36 Claims, 5 Drawing Sheets

DRY SPIGOT LAMPS

FIELD OF THE INVENTION

The subject invention relates to electric illumination and electric lamps and, more specifically, to novelty items using peculiarly shaped lamp holders in a suggestive combination with electric light bulbs.

BACKGROUND OF THE INVENTION

U.S. Pat. No. 4,749,126, by Kessener et al, issued Jun. 7, 1988, proposes a spectacular display of lighting by guiding light through a stream of water issuing into ambient atmosphere and directed to illuminate an object and/or turbulent water. The guided light is efficiently concentrated on the object and/or the turbulent water. As stated in that patent, that proposal belongs to a class of methods and apparatus which provide water jets with luminous displays.

While such aquatic luminous displays can be very impressive, they fail to address a more intellectual human need of reaching a pictorial impression through thought stimulation by a suggestive combination of objects which, in the subject case, would provide at least background illumination without a splashing of any liquid and the problems and expenses attendant thereto.

SUMMARY OF THE INVENTION

It is a general object of this invention to meet the needs stated above or otherwise mentioned herein.

It is also an object of this invention to provide improved methods and apparatus for illuminating a space.

It is a germane object of this invention to provide improved dry electric lamps.

It is a related object of this invention to provide electric lamps that evoke impressions by thought stimulations by a combination of elements in a suggestive manner. Other objects may become apparent in the further course of this disclosure.

The subject invention resides in methods of illuminating a space with a light bulb, wherein that light bulb is stuck out of the open mouth of a spout of a dry and simulated spigot structure.

From a related aspect thereof, the subject invention resides in apparatus for illuminating a space with a light bulb having a light bulb base, comprising, in combination, a dry electrified water spigot structure having a hollow spout with a simulated water outlet having an open mouth, an electric lamp socket in that spout, and electric wiring extending to that lamp socket. According to that aspect of the invention, the electric lamp socket has an opening for the light bulb base at the open mouth of the spout so that the light bulb sticks out of that dry spigot structure when the light bulb base is in the electric lamp socket. In practice, this includes the possibility of alternatingly withdrawing the light bulb into, and sticking the light bulb out of, the open mouth of the spout.

The invention also resides in methods of illuminating a space with a light source, comprising, in combination, providing a dry spigot structure with solid conductors of light suggesting water issuing from that dry spigot structure, and positioning the light source for illumination of the solid conductors from time to time.

The invention similarly resides in apparatus for illuminating a space with a light source, comprising, in combination, a dry spigot structure, and solid conductors of light issuing from that dry spigot structure. The light source in that case is positioned for illumination of the solid conductors from time to time.

BRIEF DESCRIPTION OF THE DRAWINGS

The subject invention and its various aspects and objects may become more readily apparent from the following detailed description of preferred embodiments thereof, illustrated by way of example in the encompanying drawings, in which like reference numerals, or reference numerals raised by one or more hundreds, designate like or equivalent parts, and in which.

DESCRIPTION OF PREFERRED EMBODIMENTS

Figure 1:
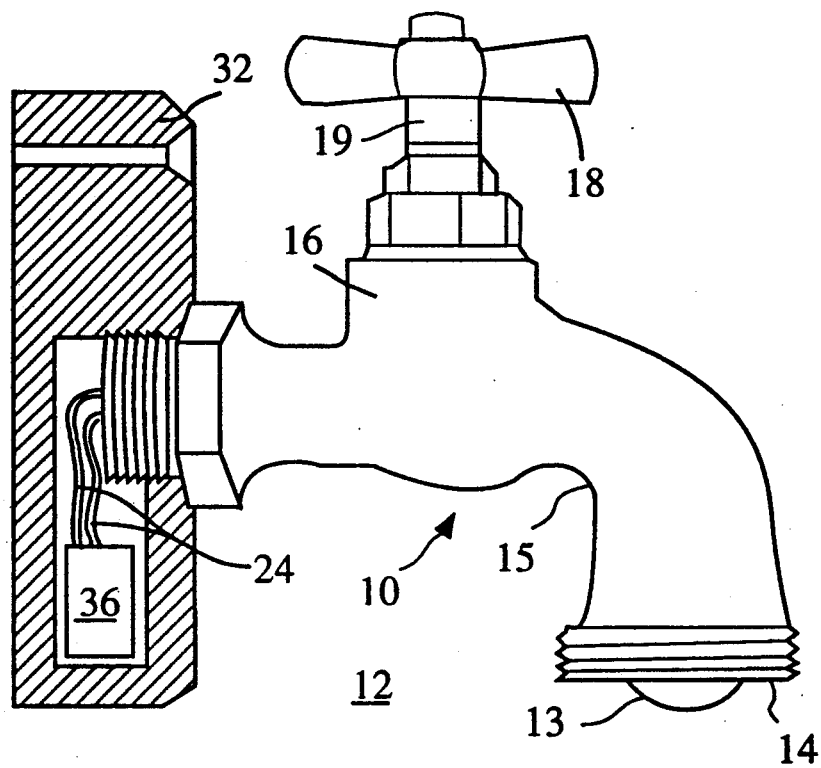
FIG. 1 is a side view of a dry electric lamp according to an embodiment of the subject invention.

The drawings illustrate methods and show apparatus 10, 110, 210 and 310 for illuminating a space 12 with a light bulb 13. According to an embodiment of the invention, such as the embodiment shown in FIGS. 1 to 4, the light bulb 13 is stuck out of the open mouth 14 of a spout 15 or 115 of a dry spigot structure 16 or 116.

According to the illustrated embodiments of the invention, the open mouth 14 and the stuck out light bulb 13 are directed downwardly.

In principle, the light bulb 13 may be an incandescent, fluorescent, phosphorescent, luminescent or other source of light. A filament 17 is shown in FIG. 2 to suggest an incandescent light bulb as the currently conceived best mode of carrying the invention into effect.

The light bulb 13 preferably is shaped in the manner of a drop of water protruding out of the spout 15 as seen, for instance in FIG. 1. This particularly well addresses an intellectual human need of reaching a concrete pictorial impression through thought stimulation by a suggestive combination of objects which, in the subject case, comprise a dry spigot structure, such as shown at 16 and 116, and a light bulb 13 projecting from a simulated water outlet 15 thereof, preferably in a shape suggesting a large drop of water. In this manner the resulting lamps, such as the lamps 10 and 110 provide at least backround illumination without any splashing of water or other liquid and without the problems and expenses attendant thereto.

Figure 2:
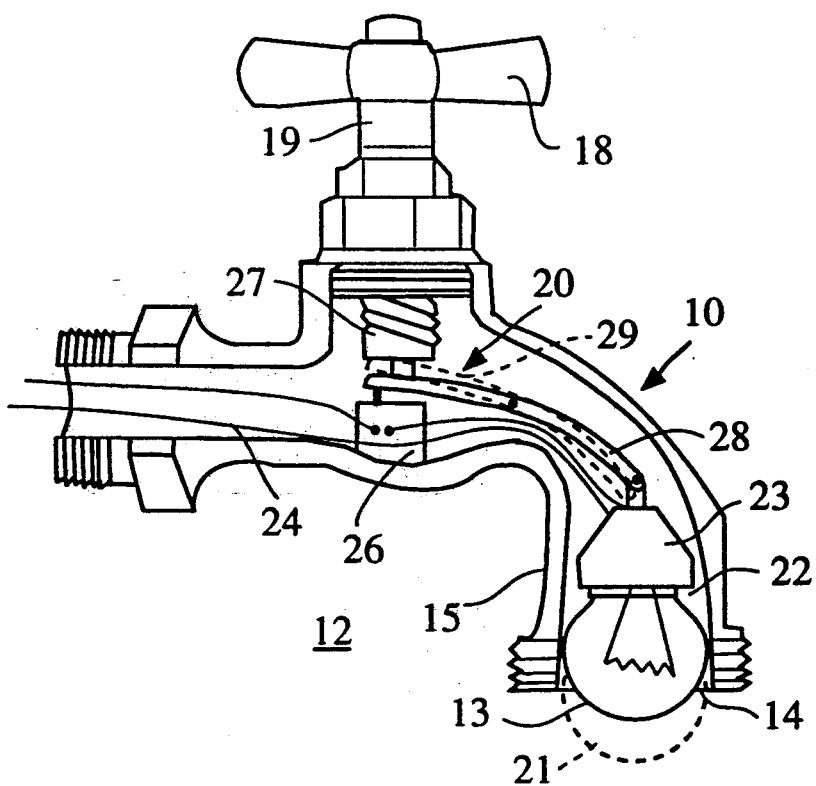
FIG. 2 is a section through the lamp of FIG. 2 showing an embodiment of the invention.
Figure 3:
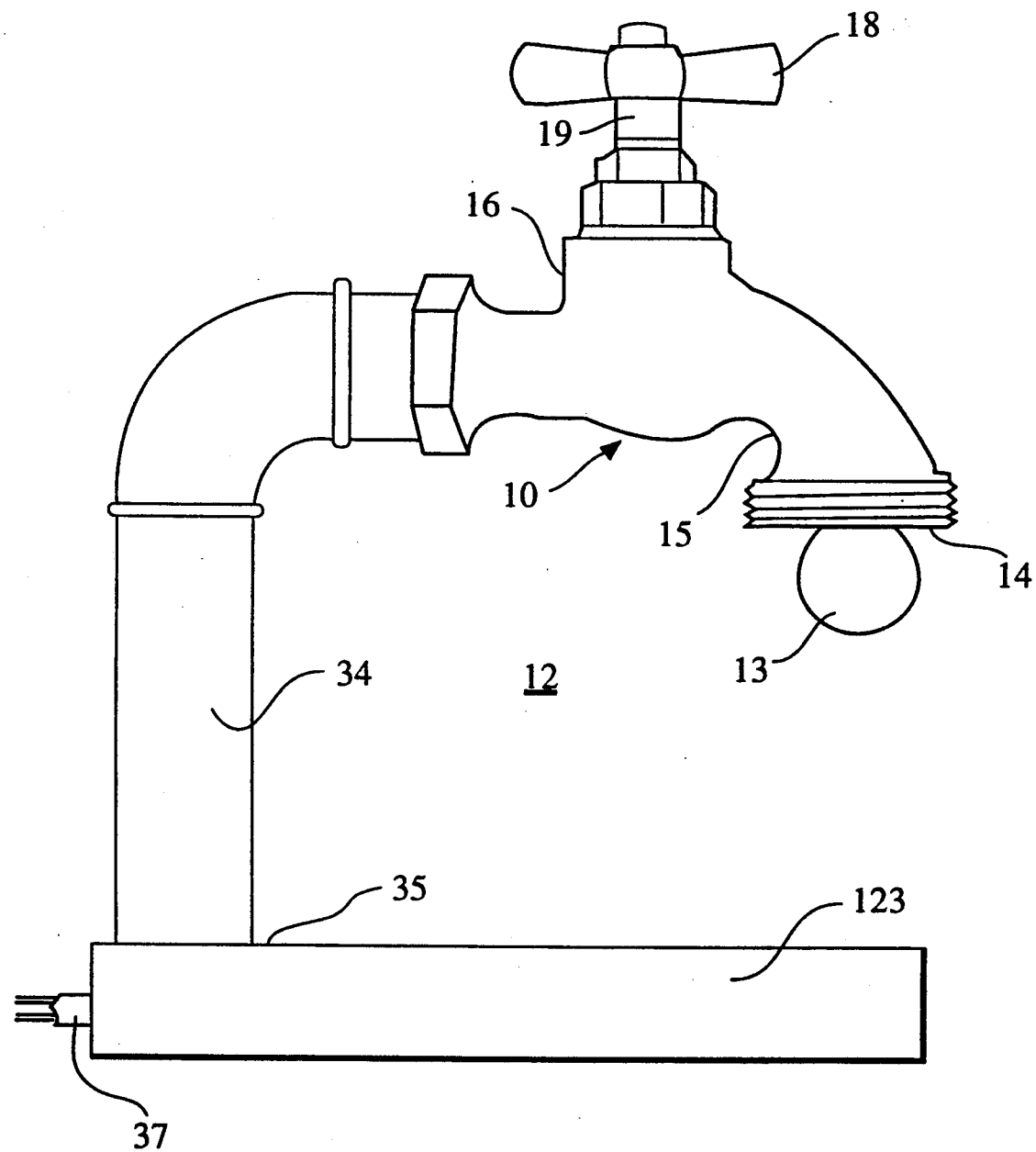
FIG. 3 is a view similar to FIG. 1 with another lamp base according to an embodiment of the invention.

The desired effect is particularly strong when the dry spigot structure is shaped in the form of a faucet as shown at 10 in FIGS. 1 to 3, having preferably a downwardly directed spout 15, and the light bulb 13 is stuck out of that downwardly directed spout.

Figure 4:
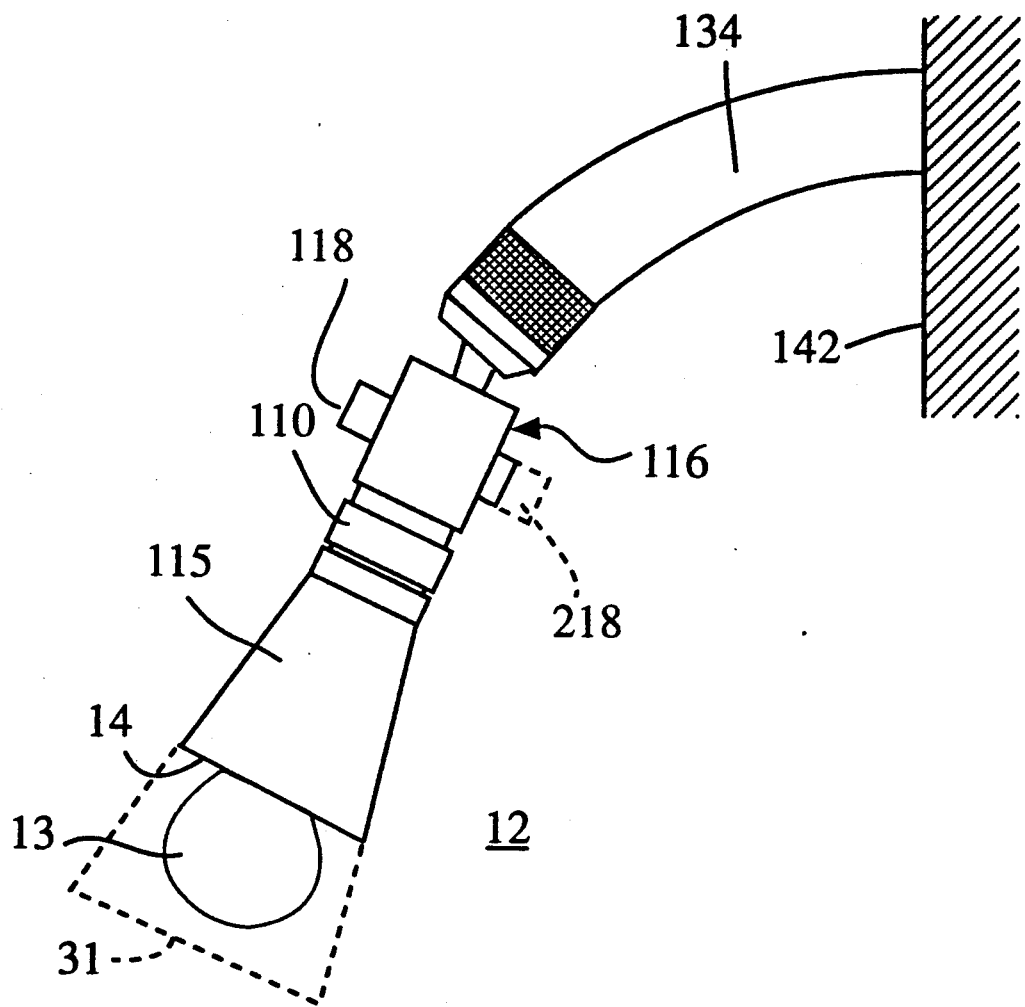
FIG. 4 is a side view of an electric lamp according to another embodiment of the invention.

An alternative embodiment is shown in FIG. 4 where the dry spigot is shaped in the form of a showerhead shown at 110, having a spout 115, and the light bulb 13 is stuck out of that spout.

FIGS. 1 to 4 thus illustrate two specific examples of the versatility of the subject invention.

According to the illustrated preferred embodiments of the invention, the dry spigot structure 16 or 116 has a simulated water flow actuator 18 or 118, and the light bulb 13 is actuated with that simulated water flow actuator. Within the scope of that embodiment, the light bulb 13 may be turned on and off by actuating a simulated water flow actuator. For instance, if the actuator is a rotary tap or handle 18, a rotary electric switch coupled to a shaft 19 of that handle may be provided for that purpose inside the spigot or faucet 16. If the actuator is a pushbutton or slide 118, an electric pushbutton or slide switch may be used for that purpose, having for instance a solidly illustrated position in which the lamp is switched off, and alternative position shown in dotted lines at 218, in which the lamp is switched on.

Alternatively or additionally, the simulated water flow actuator may be used to move the light bulb 13 relative to the spout 15. For instance, the tap or rotary handle 18 may be used to actuate a mechanism 20 which alternatively withdraws the light bulb into, and sticks that light bulb 13 out of, the open mouth 14 of the spout 15, as indicated by a dotted outline 21.

The drawings specifically show the bulb 13 as having a light bulb base 22. These apparatus 10 and 110 comprise in combination, a dry electrified water spigot structure 16 or 116 having a hollow spout 15 or 115 with an open mouth 14 and an electric lamp socket 23 in that spout, shown by way of example in FIG. 2. Electric wiring 24 may extend to that lamp socket.

Such electric lamp socket has an opening 24 for the light bulb base 23 at the open mouth 14 of the spout 15 so that the light bulb sticks out or can stick out of the dry spigot structure when its light bulb base 22 is in the electric lamp socket 23.

The light bulb has an on-off or a dimmer switch 26 in its electric wiring 24 including the simulated water flow actuator 18 or 118 on the dry electrified water spigot structure 16 or 116. Alternatively or additionally, the light bulb moving mechanism 20 in the dry electrified water spigot structure may include the simulated water flow actuator 18 as well.

For example, a threaded spindle 27, as in a water faucet, may be used to actuate the switch 26. A pivoted lever 28 may be used for that purpose and also for suspending the lamp 13 via lamp socket 23, such as shown in FIG. 2.

The tap or handle 18 and spindle 27 may be rotated so that the shaft 19 moves upwardly along its longitudinal axis and the lever 28 moves to its dotted position 29. This closes the normally open switch 26, energizing the light bulb 13 to shine, and lowers such light bulb to its dotted position 21. Conversely, if the tap or handle 18 is rotated in the opposite direction, the bulb 13 is withdrawn into the spout 15 and the switch is again opened, whereby the bulb is deenergized. The mechanism 20 is not the only means for alternatingly withdrawing the light bulb into, and sticking that light bulb out of the open mouth of the spout within the scope of the invention. Various mechanisms for moving lamps have become known over the years. Reference may be had to U.S. Pat. No. 1,448,640, by H. J. Seely, issued Mar. 13, 1923 for a reflector, U.S. Pat. No. 1,464,382, by R. M. Eaton, issued Aug. 7, 1923 for a mechanically adjustable electric lamp, and U.S. Pat. No. 4,343,031, by K. Liebegott, issued Aug. 3, 1982 for a lamp adjusting device.

Also FIG. 4 shows by a dotted outline 31 how the spout 115 may be moved downwardly until it covers or shades the bulb 13. It may thus be seen that the phrase "withdrawing the light bulb into the spout" is a relative phrase covering not only movement of the bulb relative to the spout, but also movement of the spout relative to the bulb or, in other words, movement of bulb and spout relative to each other.

The lighting apparatus 10 and 110 may have a lamp base for the dry electrified water spigot structure 16 or 116, such as the wall base 32 shown in FIG. 1 or the piping 134 shown in FIG. 4, which may also be provided with a wall base 32 as shown in FIG. 1. An example of a lighting fixture to which the simulated showerhead may be attached is apparent from U.S. Design Pat. No. 226,325, by R. B. Poff, issued Feb. 13, 1973.

Alternatively, the lighting apparatus may have a lamp stand for said dry electrified water spigot structure 16 or 116, such as the lamp stand 35 having simulated water piping 34 and a floor or table base 132. Another example of a lamp base may be seen from U.S. Design Pat. No. 173,470, by H. A. Barnacle, issued Nov. 16, 1954.

As shown in FIG. 1, an electric power source or battery 36 may be provided in the lamp base 32. Alternatively, an electric cord 37 may be provided, such as shown in FIG. 3 for the base 132, in order to supply electricity to the lamp 10 or 110 and bulb 13.

Figure 5:
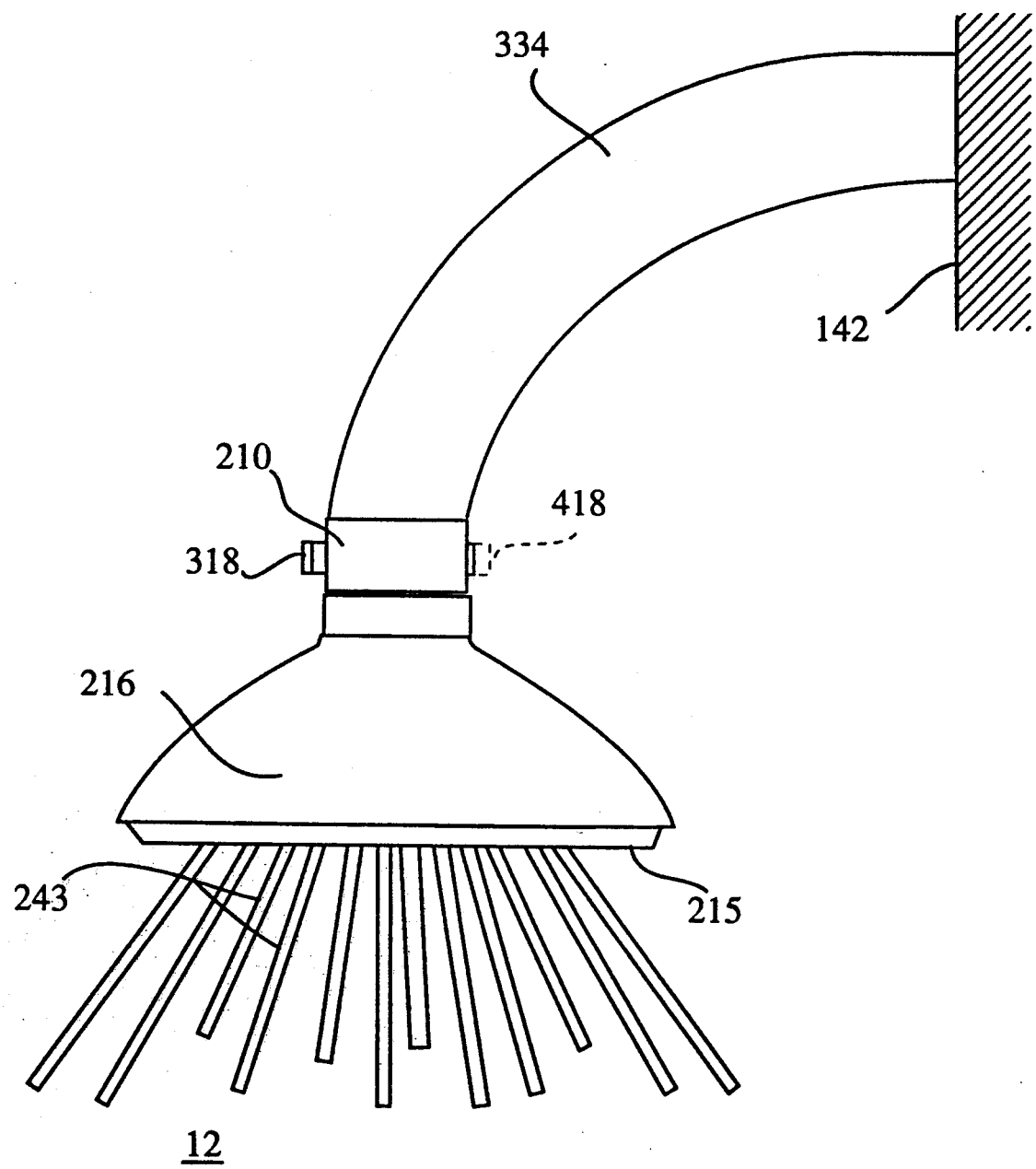
FIG. 5 is a side view of an electric lamp according to yet another embodiment of the invention.
Figure 6:
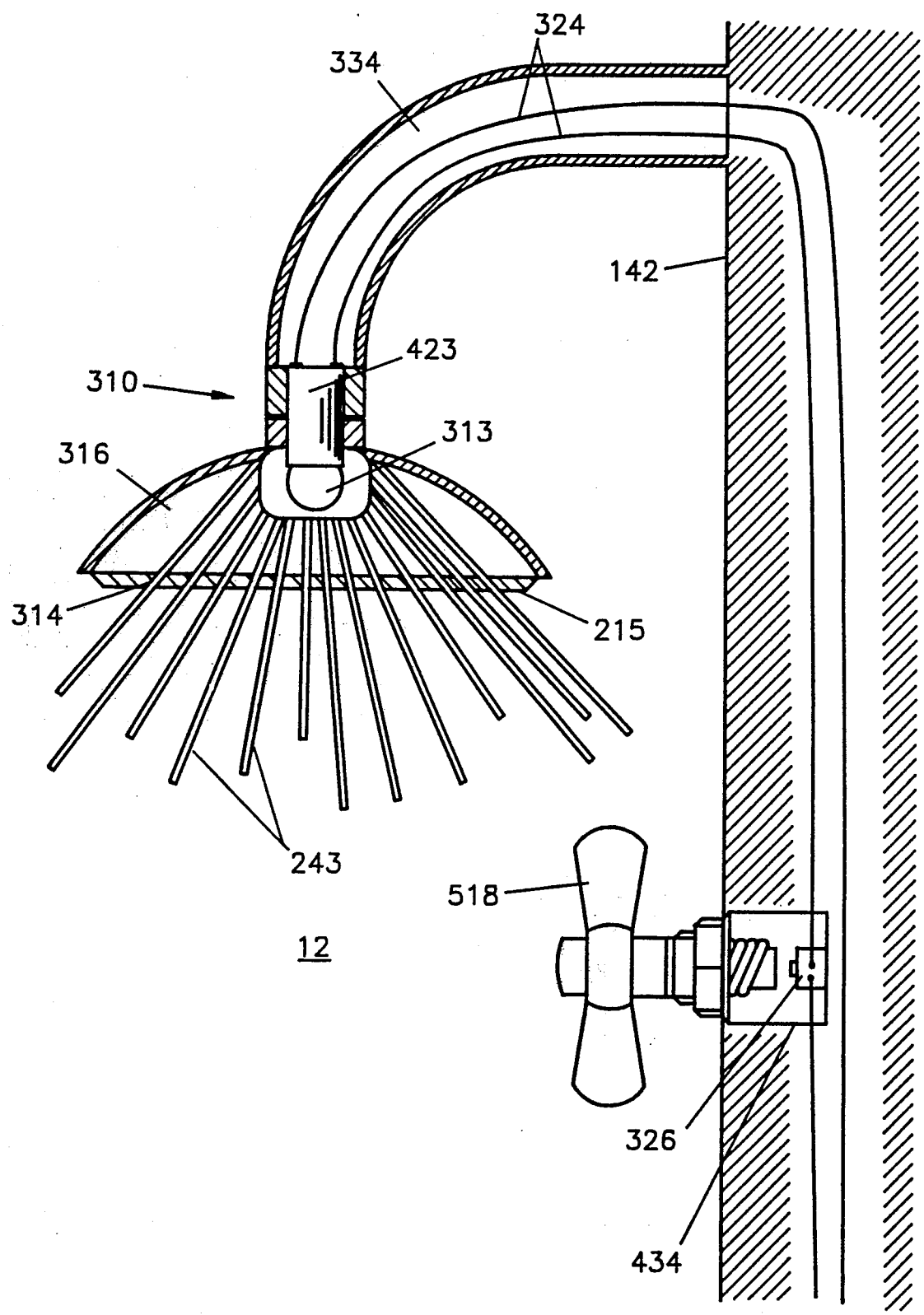
FIG. 6 is a view similar to FIG. 5 but showing a modification thereof.

Methods and apparatus of illuminating a space with a light source 313 according to embodiments of a different aspect of the invention are shown by way of example in FIGS. 5 and 6.

These embodiments provide a dry spigot structure 210 or 310 with solid conductors 243 of light suggesting water issuing from that dry spigot structure. The light source 313 may be a bulb or other light source and is positioned for illumination of the solid conductors from time to time.

The light conductors 243 are designated as solid, which is an adjective often used in contradistinction to fluid or liquid. Accordingly, the light conductors may be rigid or flexible, as long as they are not fluid or liquid. By way of example, the light conductors may be colorless or colored rods of transparent or translucent material, optical fibers, or other rigid or flexible light conductors.

Also, by way of example, FIGS. 5 and 6 show the dry spigot structure 210 or 310 in the form or shape of a simulated showerhead 216 or 316 having simulated water outlet openings, such as shown at 314 in FIG. 6, where the solid conductors of light 243 are stuck out of such simulated water outlet openings. The same structural arrangement may be employed in the embodiment of FIG. 5. In this or any other manner, solid conductors 243 are positioned to issue from an area 215 of the dry spigot structure wherefrom water would be issuing in a similar wet spigot structure. It is, of course, well known that water would issue from the mouth 14 of the spigot 16 or showerhead 116, or from the outlet openings 314 of the showerhead 216 or 316, if these spigot structures were actual spigots, faucets or showerheads. Accordingly, light conductors in the currently discussed embodiment of the invention are issued out of the openings 14 or 314, such as the dry or solid light conductors 243 simulating the issuance of water, particularly when illuminated from the outside or from the inside of the dry spigot structure.

At least according to FIG. 6, the light source 313 is located inside the simulated showerhead 316 for illuminating the solid conductors of light 243. The light source 313 in particular may be positioned adjacent ends of the solid conductors of light 243 inside the dry spigot structure or showerhead 316 as shown in FIG. 6. A lamp socket 423 may be used for that purpose.

Like the simulated showerhead 116, the dry spigot structure 210 or showerhead 216 has a simulated water flow actuator 318 which may again comprise an electrical pushbutton or slide switch, and the light source, such as the bulb 313, is actuated with that simulated water flow actuator, such as indicated at 418. The light source may be turned on and off by actuating the simulated water flow actuator 318 or by a simulated water flow actuator 518. In this respect, the simulated water flow actuator may be provided on the dry spigot structure, as shown for the structure 210 or 216 and the electric lamp switch 318 in FIG. 5.

Alternatively, the simulated water flow actuator may be spaced from the dry spigot structure, such as shown for the structure 310 or 316 and the rotatable actuator 518 in FIG. 6. By way of example, FIG. 6 shows an actuator 518, similar to the actuator 18, acting on a switch 326, similar to the switch 26 shown in FIG. 2, except that the switch 326 may be a normally open switch that is closed by rotation of the actuator 518 to energize the light source 313 through wiring 324 extending through a curved conduit 334.

By way of example, the rotatable electric actuator 518 may be located in a wall 142 to which the simulated showerhead conduit 134 or 334 is attached in any suitable manner. The switch 326 may then be in a box 343 in that wall 142, and electrical conduits (not shown) may be used to accommodate the wiring 324 inside the wall. Within the scope of such embodiment, the conduit 334 may extend to the switch box 343 either inside or outside of the wall, as desired.

The subject extensive disclosure will render apparent or suggest to those skilled in the art various other modifications and variations within the spirit and scope of the subject invention and equivalents thereof.

We claim:

1. A method of illuminating a space with a light bulb, comprising:
providing a dry and simulated spigot structure with a spout having an open mouth; and
sticking said light bulb out of said open mouth of said spout of the dry and simulated spigot structure.

2. A method as in claim 1, including:
directing said open mouth and said light bulb downwardly.

3. A method as in claim 1, including:
shaping said light bulb in the manner of a drop of water protruding out of said spout.

4. A method as in claim 1, including:
providing said dry spigot structure with a simulated water flow actuator; and
actuating said light bulb with said simulated water flow actuator.

5. A method as in claim 4, including:
turning said light bulb on and off by actuating said simulated water flow actuator.

6. A method as in claim 4, including:
moving said light bulb relative to said spout with said simulated water flow actuator.

7. A method as in claim 1, including:
alternatingly withdrawing said light bulb into and sticking said light bulb out of said open mouth of the spout.

8. A method as in claim 1, including:
shaping said dry spigot structure in the form of a faucet having a downwardly directed spout; and
sticking said light bulb out of said downwardly directed spout.

9. A method as in claim 1, including:
shaping said dry spigot in the form of a showerhead having a spout; and
sticking said light bulb out of said spout.

10. A method as in claim 9, including:
moving said spout of the dry and simulated spigot structure relative to said light bulb.

11. A method as in claim 9, including:
shaping said light bulb in the manner of a drop of water projecting from said simulated water outlet.

12. Apparatus for illuminating a space with a light bulb having a light bulb base, comprising in combination:
a dry electrified water spigot structure having a hollow spout with a simulated water outlet having an open mouth;
an electric lamp socket in said spout; and
electric wiring extending to said lamp socket;
said electric lamp socket having an opening for said light bulb base at said open mouth of the spout so that said light bulb sticks out of said dry spigot structure when said light bulb base is in said electric lamp socket.

13. Apparatus as in claim 12, wherein:
said open mouth faces downwardly and said light bulb sticks out of said hollow spout downwardly.

14. Apparatus as in claim 12, wherein:
said light bulb is shaped in the manner of a drop of water protruding out of said spout.

15. Apparatus as in claim 12, wherein:
said dry spigot structure has a light bulb actuator comprising a simulated water flow actuator.

16. Apparatus as in claim 12, wherein:
said light bulb has an on-off switch in said electric wiring including a simulated water flow actuator on said dry electrified water spigot structure.

17. Apparatus is in claim 12, including:
means for alternatingly withdrawing said light bulb into, and sticking said light bulb out of, said open mount of the spout.

18. Apparatus as in claim 12, wherein:
said dry spigot structure is a dry faucet having a downwardly directed spout; and
said light bulb is sticking out of said downwardly directed spout.

19. Apparatus as in claim 12, wherein:
said dry spigot is a dry showerhead having a spout; and
said light bulb is sticking out of said spout.

20. Apparatus as in claim 12, including:
a lamp base for said dry electrified water spigot structure.

21. Apparatus as in claim 12, including:
a lamp stand for said dry electrified water spigot structure.

22. A method of illuminating a space with a light bulb, comprising:
providing a dry and simulated spigot structure with a spout having an open mouth; and
alternatingly withdrawing said light bulb into and sticking said light bulb out of the open mouth of said spout of the dry spigot structure.

23. A method as in claim 22, including:

directing said open mouth and said light bulb downwardly.

24. A method as in claim 22, including:
shaping said light bulb in the manner of a drop of water protruding out of said spout.

25. A method as in claim 22, including:
providing said dry spigot structure with a simulated water flow actuator; and
actuating said light bulb with said simulated water flow actuator.

26. A method as in claim 25, including:
turning said light bulb on and off by actuating said simulated water flow actuator.

27. A method as in claim 25, including:
moving said light bulb relative to said spout with said simulated water flow actuator.

28. Apparatus for illuminating a space with a light bulb having a light bulb base, comprising in combination:
a dry electrified water spigot structure having a hollow spout with an open mouth;
an electric lamp socket in said spout;
electric wiring extending to said lamp socket;
said electric lamp socket having an opening for said light bulb base at said open mouth of the spout so that said light bulb sticks out of said dry spigot structure when said light bulb base is in said electric lamp socket; and
a light bulb moving mechanism in said dry electrified water spigot structure, including a simulated water flow actuator on said dry electrified water spigot structure.

29. Apparatus as in claim 28, wherein:
said open mouth faces downwardly and said light bulb sticks out of said hollow spout downwardly.

30. Apparatus as in claim 28, wherein:
said light bulb is shaped in the manner of a drop of water protruding out of said spout.

31. Apparatus as in claim 28, wherein:
said light bulb has an on-off switch in said electric wiring coupled to said simulated water flow actuator on said dry electrified water spigot structure.

32. Apparatus is in claim 28, wherein:
said light bulb moving mechanism includes means for alternatingly withdrawing said light bulb into, and sticking said light bulb out of, said open mouth of the spout.

33. Apparatus as in claim 28, wherein:
said dry spigot structure is a dry faucet having a downwardly directed spout; and
said light bulb is sticking out of said downwardly directed spout.

34. Apparatus as in claim 28, wherein:
said dry spigot is a dry showerhead having a spout; and
said light bulb is sticking out of said spout.

35. Apparatus as in claim 28, including:
a lamp base for said dry electrified water spigot structure.

36. Apparatus as in claim 28, including:
a lamp stand for said dry electrified water spigot structure.

* * * * *